United States Patent [19]

Brewer

[11] Patent Number: 5,033,368

[45] Date of Patent: Jul. 23, 1991

[54] LARGE CAPACITY GAS FIRED PRESSURE COOKER

[75] Inventor: Edward L. Brewer, Eaton, Ohio

[73] Assignee: Henny Penny Corporation, Eaton, Ohio

[21] Appl. No.: 579,211

[22] Filed: Sep. 5, 1990

Related U.S. Application Data

[63] Continuation of Ser. No. 494,631, Mar. 16, 1990, abandoned.

[51] Int. Cl.$^5$ .......................... A47J 37/12; A47J 27/00
[52] U.S. Cl. .......................................... 99/403; 99/330; 126/343.5 A; 126/357; 126/391
[58] Field of Search ............... 99/330, 331, 339, 336, 99/359, 403, 407, 408; 126/391, 390, 357, 375, 343.5 A, 343.5 R; 426/438; 431/328, 326

[56] References Cited

U.S. PATENT DOCUMENTS

| | | |
|---|---|---|
| 2,053,568 | 9/1936 | Levin ..................................... 99/408 |
| 3,990,433 | 11/1976 | Keating ............................... 126/391 |
| 4,397,299 | 8/1983 | Taylor et al. .................. 126/343.5 A |
| 4,508,026 | 4/1985 | Anetsberger et al. ................. 99/407 |
| 4,602,612 | 7/1986 | Schwizer ............................. 126/390 |
| 4,690,127 | 9/1987 | Sank ..................................... 431/328 |
| 4,704,290 | 11/1987 | Fritzsche ............................. 426/438 |
| 4,751,915 | 6/1988 | Price ..................................... 99/403 |
| 4,752,213 | 6/1988 | Grochowski et al. .............. 431/328 |
| 4,848,318 | 7/1989 | Brewer ................................. 99/403 |
| 4,913,041 | 4/1990 | Taber et al. ........................... 99/403 |

FOREIGN PATENT DOCUMENTS

2307225  2/1972  Fed. Rep. of Germany ........ 99/403

Primary Examiner—Timothy F. Simone
Attorney, Agent, or Firm—Frost & Jacobs

[57] ABSTRACT

A large capacity pressure cooker heated by a pair of radiant burner units utilizing a gas/air mixture. The pressure cooker has a cabinet containing a large pot charged with a predetermined amount of cooking oil. The pot has sides, front and rear walls terminating at their lowermost edges in a bottom. The pot top extends partway above the cabinet and is provided with a removable pressure-tight lid. An insulated shell fully surrounds and is sealed to the pot intermediate its top and bottom. The shell supports the burners in parallel spaced relationship to the pot sides. The burners extend beyond the front and rear edges of the pot sides. Horizontal baffles within the shell divide the shell into a combustion chamber for each burner and flue passageways above each combustion chamber. The combustion chambers are separated from each other by vertical baffles at the front and rear of the pot. The flue passageways are similarly separated from each other at the front of the pot and are connected to a flue at the rear of the pot. Each combustion chamber is connected to its respective flue passageway at the front of the pot so that products of combustion circulate to the front of the pot in the combustion chambers, enter the flue passageways and circulate to the rear of the pot, entering the flue.

12 Claims, 9 Drawing Sheets

LARGE CAPACITY GAS FIRED PRESSURE COOKER

This is a continuation of application Ser. No. 494,631, filed Mar. 16, 1990, abandoned.

TECHNICAL FIELD

The invention relates to a large capacity pressure cooker, and more particularly to such a pressure cooker heated by a pair of radiant burner units utilizing a gas/air mixture.

BACKGROUND ART

Prior art workers have devised numerous types of large capacity pressure cookers. Such pressure cookers generally comprise a pot of a size to receive a wire basket in which products to be cooked are placed and then immersed in cooking oil contained within the pot. The pot is closed by a lid which is sealed to the top of the pot, whereupon the products are cooked for the desired length of time under heat and pressure. Following the cooking cycle, the pressure in the pot is relieved that the lid is opened, whereupon the products are removed from the wire basket, the customary practice being to transfer the cooked products to trays which are of a size to be received in a holding and/or display cabinet where the cooked products are retained under controlled conditions until served.

It is usual practice to provide an electrical heating element to heat the cooking oil within the pot. Examples of such large capacity pressure cookers are taught in co-pending application Ser. No. 07/283,571, filed Dec. 3, 1988, U.S. Pat. No. 4,930,408 in the name of James D. King and Stephen D. Werts, and entitled LARGE CAPACITY PRESSURE COOKER, and co-pending application Ser. No. 07/403,589, filed Sept. 6, 1989, U.S. Pat. No. 4,997,101 in the names of James D. King and Stephen D. Werts, entitled A SINGLE HANDLE LID OPENING, CLOSING AND LOCKING MECHANISM FOR A LARGE CAPACITY PRESSURE COOKER.

In some instances, due to the economy and availability of natural gas or propane, it would be desirable to provide a large capacity Pressure cooker wherein the cooking oil within the pot is heated by radiant burner units utilizing a gas/air mixture. Furthermore, such a unit would not require the need for special wiring and the like.

The present invention is based upon the discovery that a large capacity, gas fired pressure cooker can be provided which is very simple in construction and efficient in operation. A pair of radiant burners are mounted in parallel spaced relationship to the pot sides by an insulative shell which completely surrounds the pot. The shell is provided with baffles which divide the shell interior into two separate combustion chambers and two separate flue passageways, each of which extends along one-half of the pot front wall, along one of the pot sides and along one-half of the pot rear wall. The arrangement of baffles is such that the products of combustion in the combustion chambers circulate to the front wall of the pot and enter the flue passages. The products of combustion thereafter circulate along the pot sides to the pot rear wall where they enter a flue. The gas is appropriately metered to the pair of burners and both the overall amount of air and the amount of air mixed with gas for each burner are individually controllable. Each burner has an ignitor and safety devices are provided for monitoring the gas, the air, and the oil temperature within the pot.

DISCLOSURE OF THE INVENTION

According to the invention there is provided a large capacity pressure cooker heated by a pair of radiant burner units utilizing a gas/air mixture. The pressure cooker comprises a cabinet in which is mounted a large pot charged with cooking oil. The pot comprises an open top, a pair of side walls, a front wall and a rear wall. The front, rear and side walls terminate at their lowermost edges in a bottom. The open top of the pot extends partway above the cabinet and is provided with a removable pressure-tight lid.

An insulated shell fully surrounds and is sealed to the pot, intermediate its top and bottom. The shell supports the burners in parallel spaced relationship to the pot sides. Each burner extends beyond the front and rear edges of its respective pot side so as to heat the front and rear walls of the pot, as well. The surrounding shell is provided with horizontal baffles which divide the shell into a combustion chamber and a flue passageway thereabove, for each burner. The combustion chambers are separated from each other by vertical baffles located centrally of the front and rear walls of the pot. The flue passageways are similarly separated from each other at the front wall of the pot and are connected to a flue at the rear wall of the pot.

Each combustion chamber is connected to its respective flue passageway at the front wall of the pot. As a consequence, the products of combustion of each burner circulate from the rear wall of the pot along the side walls to the front wall of the pot where they enter their respective flue passageways and again circulate along and in heat exchange with the front, side and rear walls of the pot, exiting by means of the above-mentioned flue. Each burner is provided with an ignitor and a metering orifice for the gas. A blower is mounted within the pressure cooker cabinet and supplies air to both burners. Both the overall amount of air supplied and the amount of air supplied to the individual burners is adjustable. The air flow, the flames of the burners and the temperature of the cooking oil are monitored by safety devices. The large capacity gas fired pressure cooker is capable of performing any one of a number of programmed cooking cycles.

DETAILED DESCRIPTION OF THE INVENTION

Figure 1:
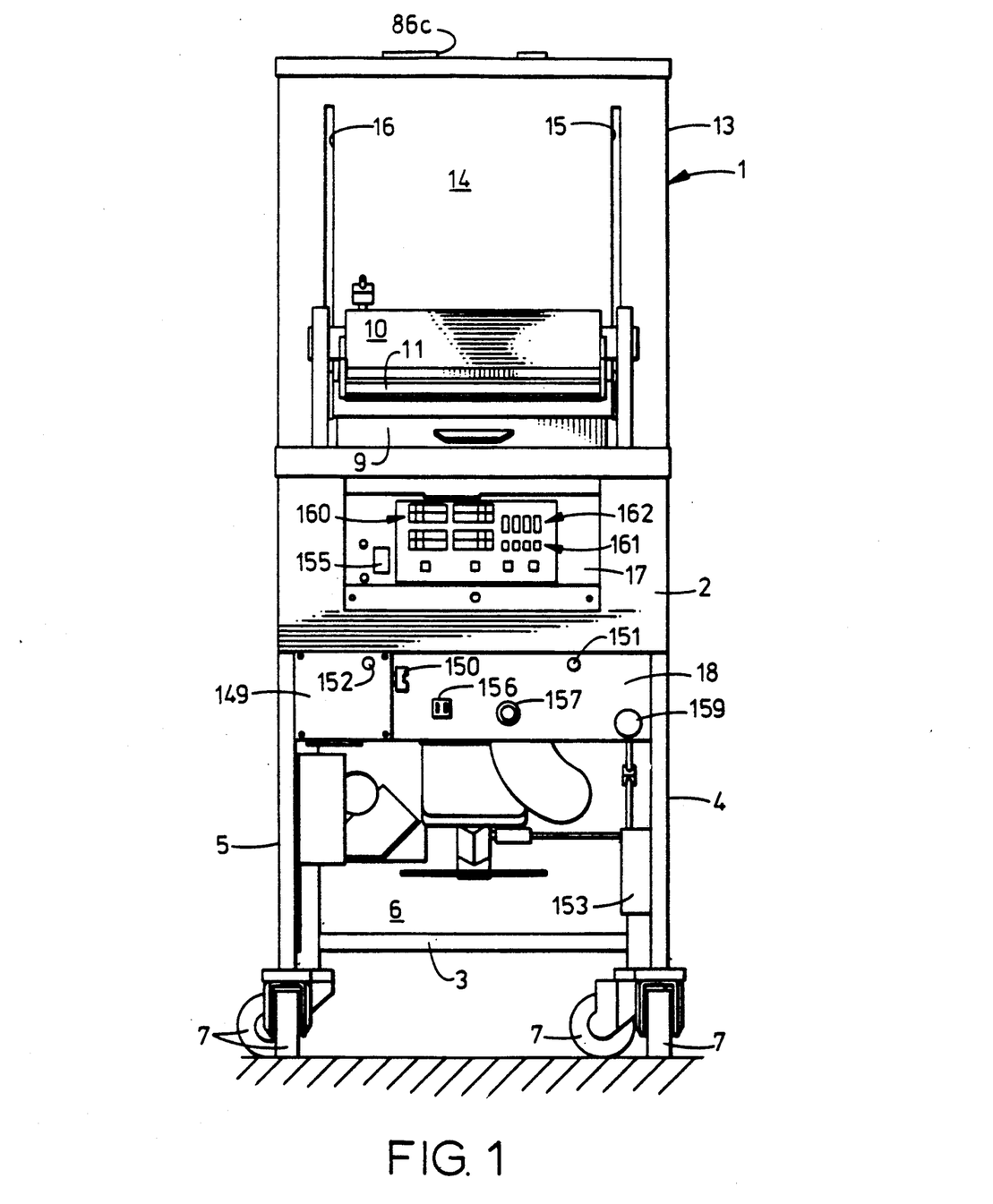
FIG. 1 is a front elevational view of a pressure cooker provided with the gas firing apparatus of the present invention.
Figure 2:
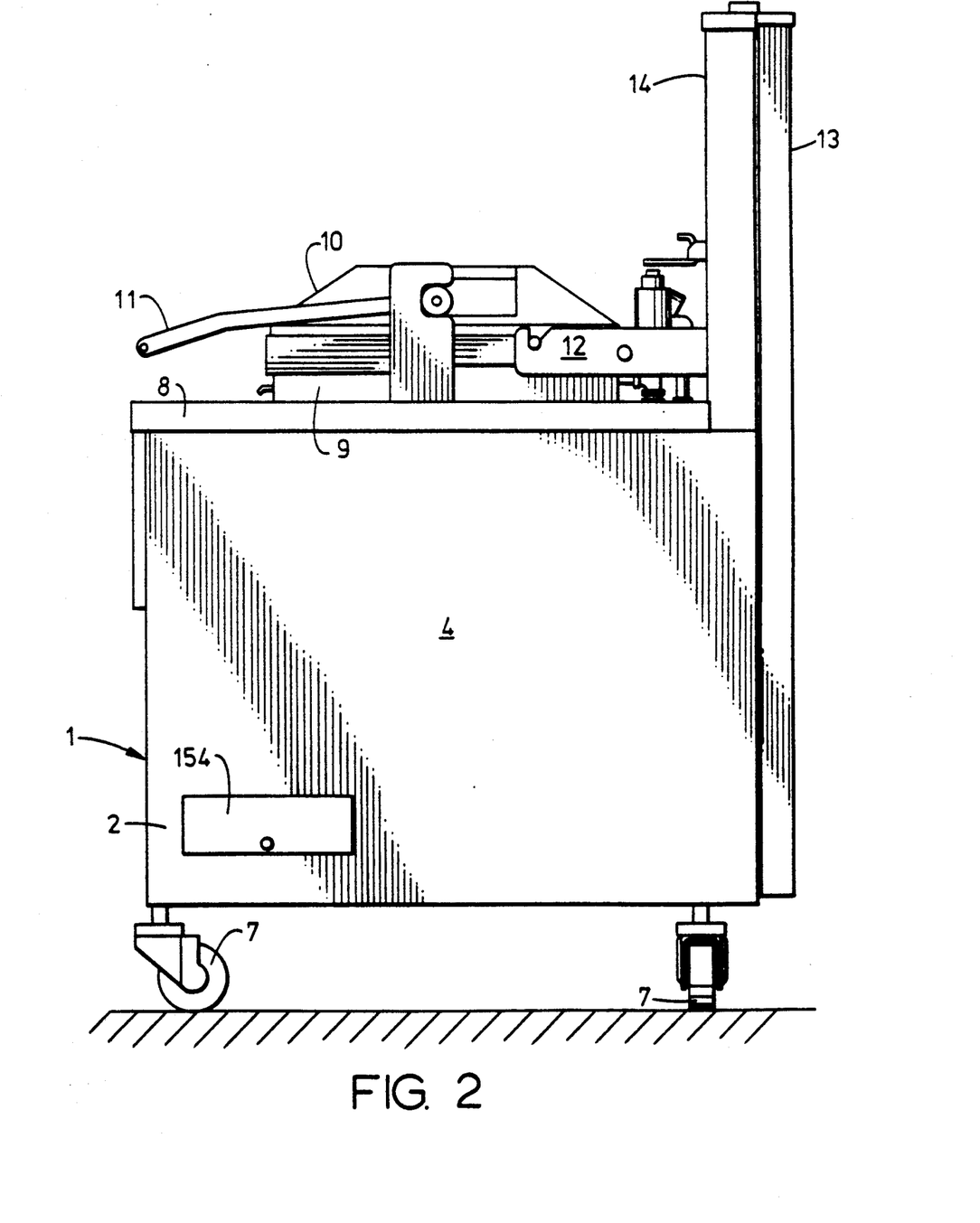
FIG. 2 is a right side elevational view of the pressure cooker of the present invention.

Reference is first made to FIGS. 1 and 2 wherein the complete gas fired pressure cooker is shown in front and side elevations, respectively. The cooker is generally indicated at 1 and comprises a cabinet 2. The cabinet 2 is made up of a framework, generally indicated at 3 (see FIG. 1) to which is affixed side walls 4 and 5 and a rear wall 6. The cabinet is preferably mounted on casters 7. The upper end of cabinet 2 is provided with a countertop 8 through which the upper end of cooking pot 9 extends. The majority of the cooking pot and the operating instrumentalities of the cooker are located within cabinet 2, as will be apparent hereinafter.

The pot 9 is provided with a lid 10. For purposes of an exemplary showing, the lid 10 is illustrated as being of the type described in the above noted co-pending application, Ser. No. 07/403,589. The lid 10 has a latching and lifting handle 11 and, when closed, forms a pressure-tight seal with the upper end of pot 9. The lid 10 is supported by mounting arms, one of which is shown in FIG. 2 at 12. The lid 10 is shiftable vertically between a closed position (shown in FIGS. 1 and 2) and an open position. The cabinet 2, at its rearward end, is provided with a vertical housing 13 having a forward surface 14. The lid mounting arms extend rearwardly through slots 15 and 16 in the front surface 14 of housing 13 and are affixed to a frame (not shown) shiftably mounted within housing 13 in a pair of vertical guide rails (not shown). The frame is connected, through a cable and pulley system, to a vertically shiftable counterweight (not shown), chosen so as to effectively counterbalance the weight of lid 10.

The pressure cooker is completed by upper and lower panels 17 and 18 at the front of cabinet 2. The panels 17 and 18 will be more fully described hereinafter.

Figure 3:
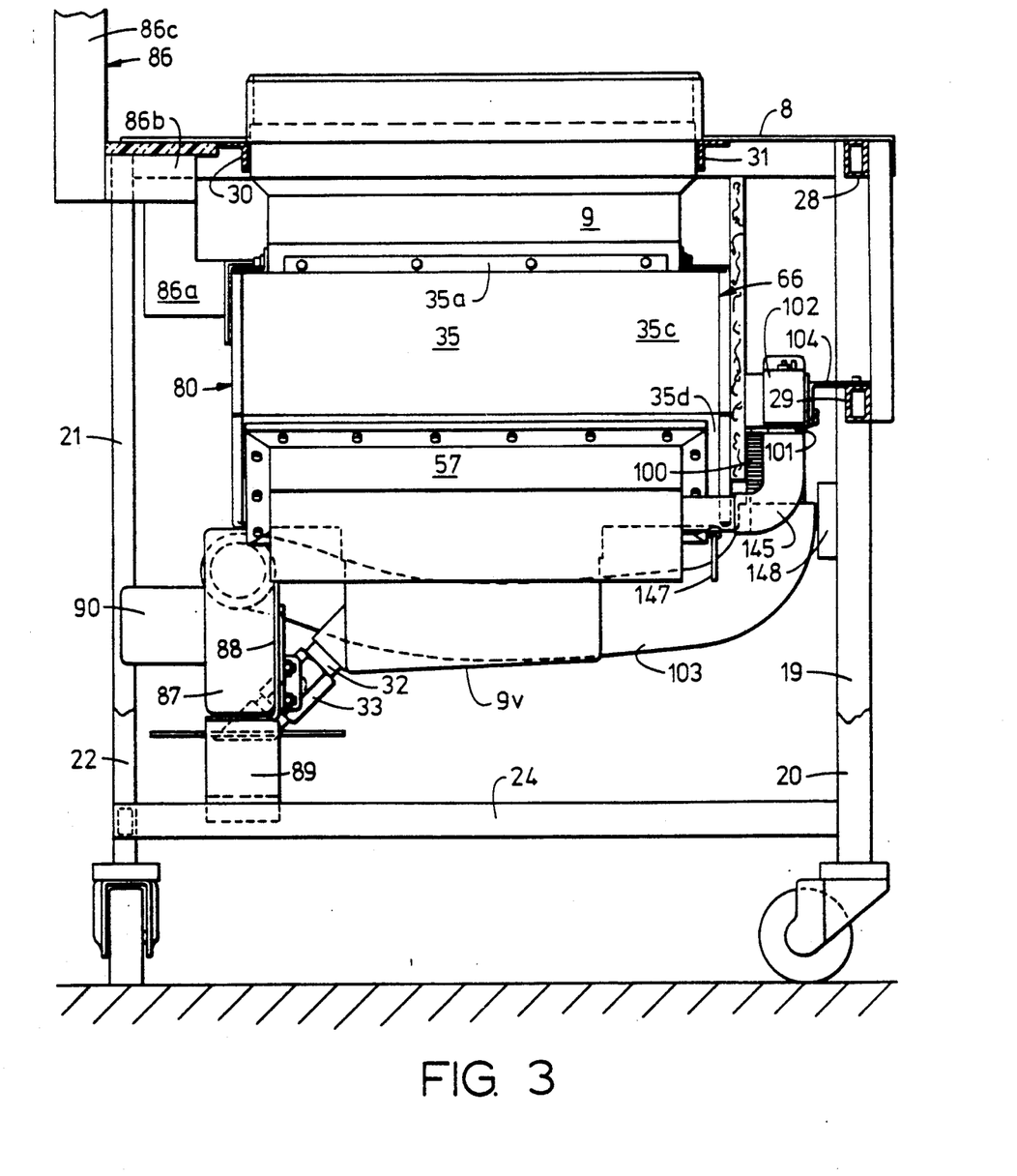
FIG. 3 is a fragmentary, side elevational view, partly in cross-section, of the cabinet of the large capacity, gas fired pressure cooker of the present invention.
Figure 4:
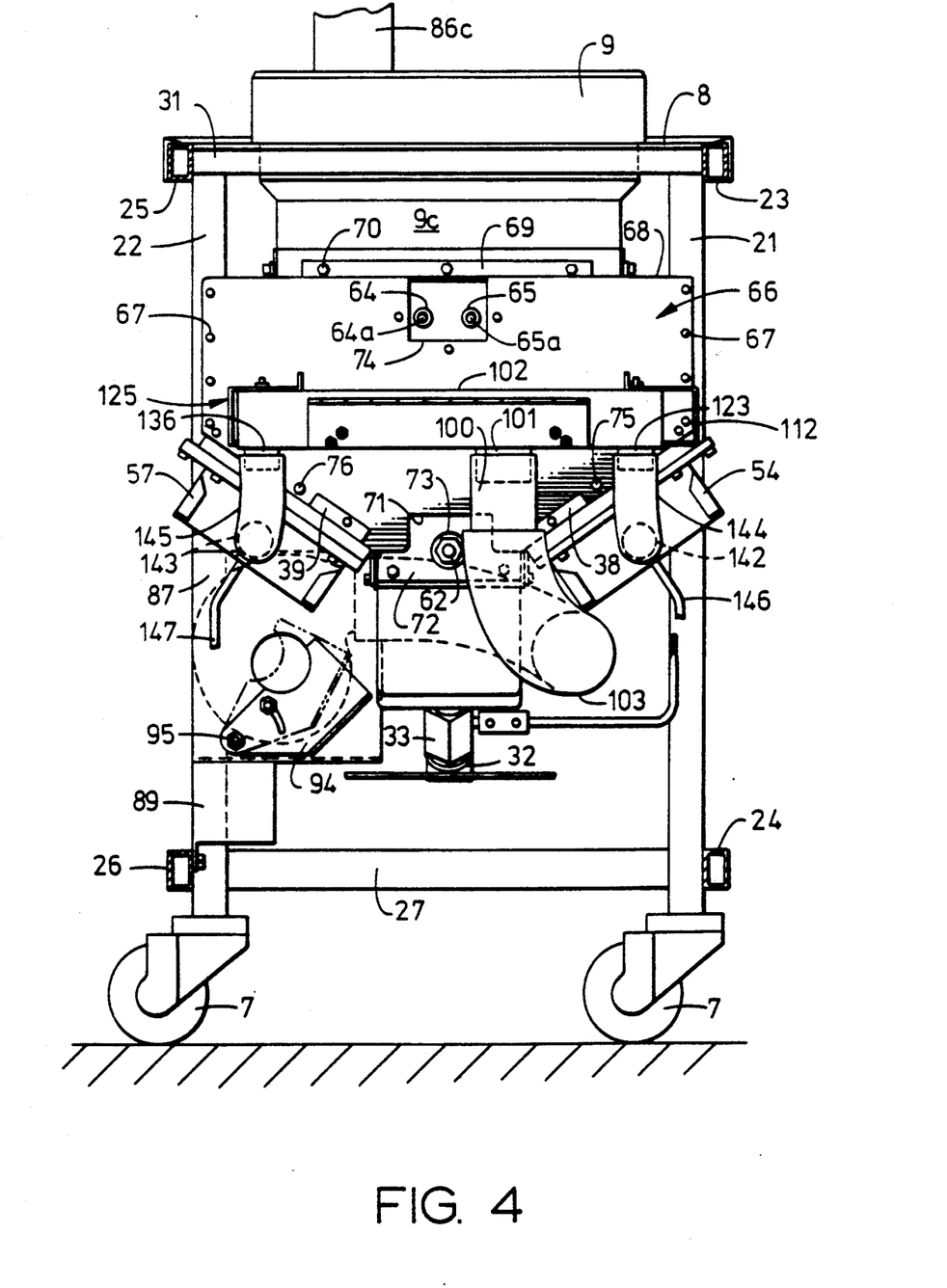
FIG. 4 is a fragmentary front elevational view, partly in cross-section, of the structure of FIG. 3.
Figure 5:
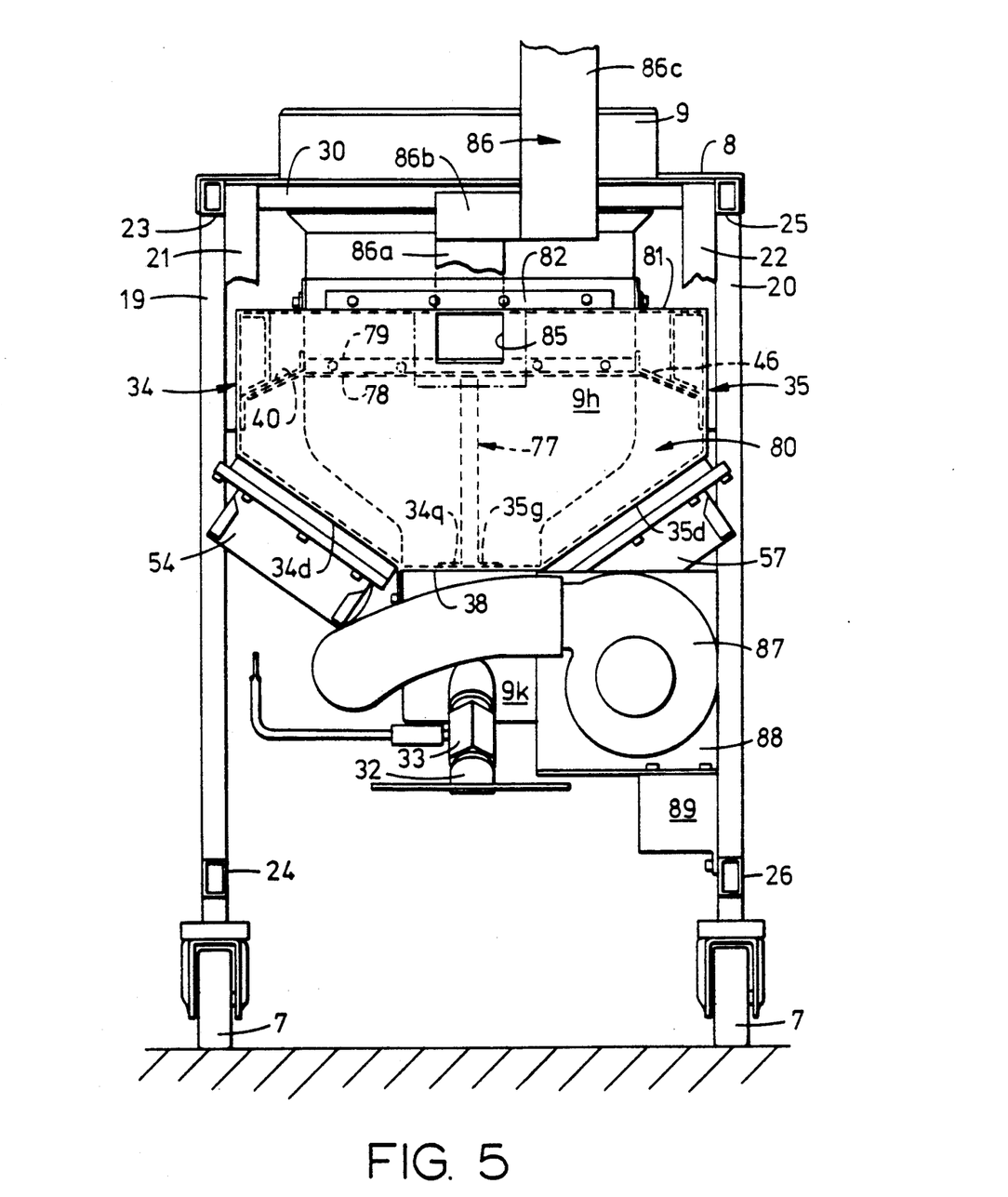
FIG. 5 is a fragmentary rear elevational view, Partly in cross-section, of the structure of FIGS. 3 and 4.

Reference is now made to FIGS. 3, 4 and 5, all three of which are views of the cabinet 2 with side walls 4 and 5, rear wall 6, housing 13 and pot lid 10 removed, for purposes of clarity. The cabinet framework (generally indicated at 3 in FIG. 1) comprises four vertical box beams 19, 20, 21 and 22. These beams terminate at their lower ends in the casters 7. The beams 19 and 21 are joined at their tops by horizontal box beam 23 and near their bottom ends by box beam 24. Similarly, beams 20 and 22 are joined at their tops by box beam 25 and near their bottom ends by box beam 26. The rear vertical beams 21 and 22 are joined together near their bottom ends by box beam 27. The front vertical beams 19 and 20 are joined together by box beams 28 and 29, as is most clearly shown in FIG. 3. A pair of angle irons 30 and 31 extend between upper horizontal beams 23 and 25 and support the pot 9.

Figure 6:
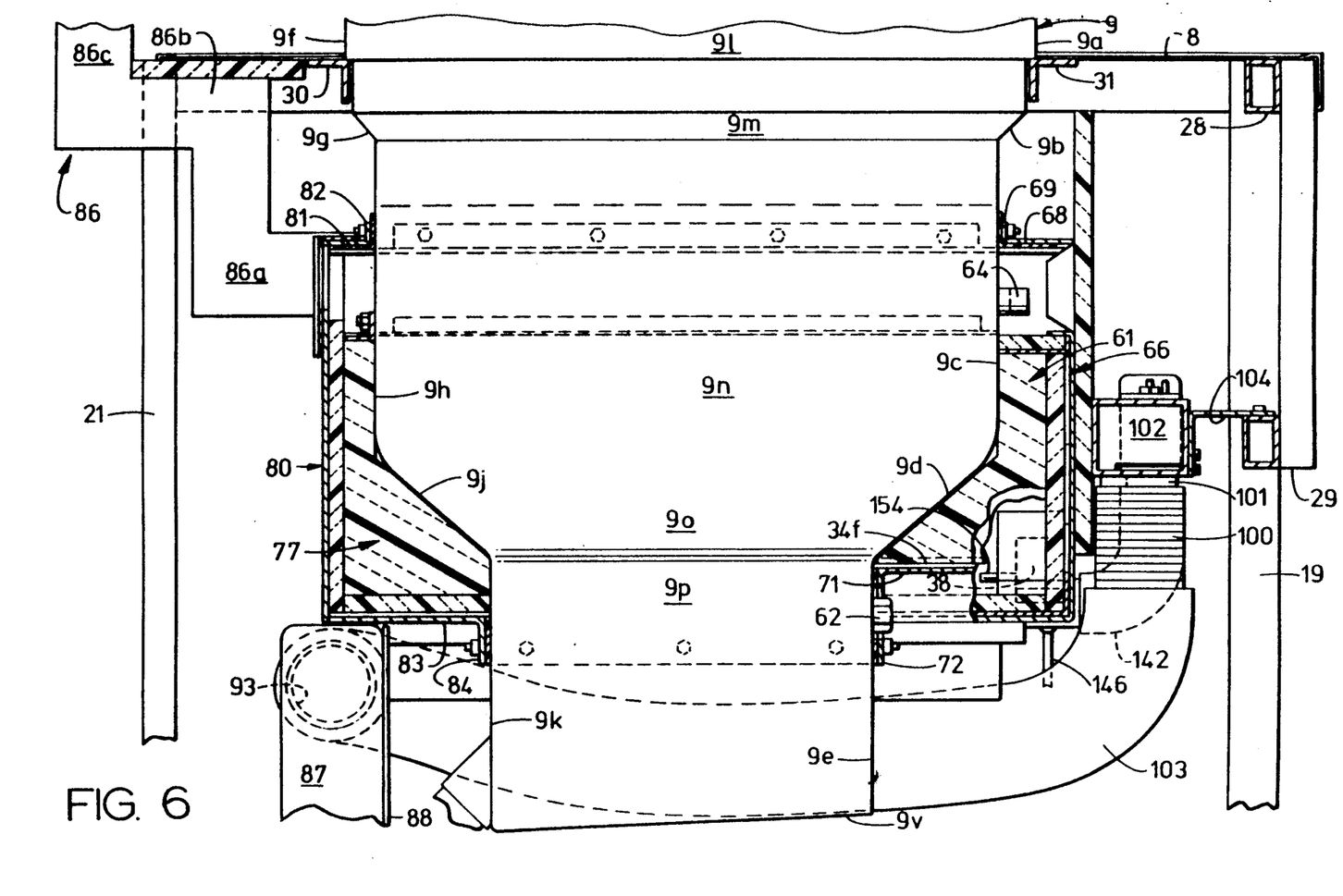
FIG. 6 is an enlarged, fragmentary, longitudinal centerline cross-sectional view of the structure of FIGS. 3-5 with the pot not sectioned.

As is best seen in FIG. 6, the pot 9 has a front wall made up of an upper stepped portion 9a, a downwardly and inwardly sloping portion 9b, a vertical portion 9c, another downwardly and inwardly sloping portion 9d and a final vertical portion 9e. Similarly, the pot 9 has a rear wall made up of a stepped portion 9f, a downwardly and inwardly sloping portion 9g, a vertical portion 9h, another downwardly and inwardly sloping portion 9j and a final vertical portion 9k.

Figure 7:
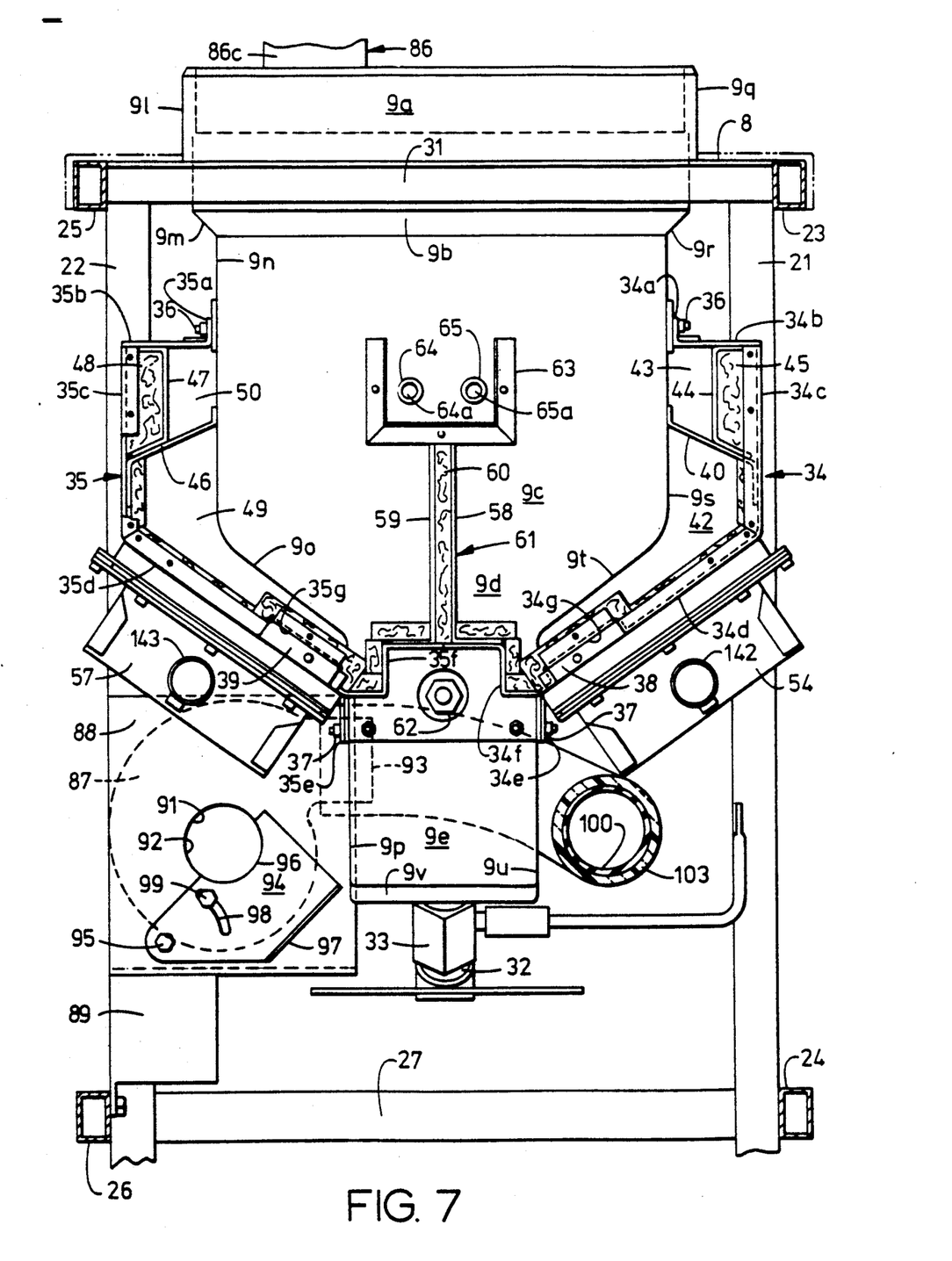
FIG. 7 is a fragmentary front elevational view partly in cross-section, similar to FIG. 4, with the front combustion chamber and flue passageways panel and air box removed.

Turning to FIGS. 6 and 7, the pot 9 has a left side comprising an upper stepped portion 9l, a downwardly and inwardly sloping portion 9m, a vertical portion 9n, a downwardly and inwardly sloping portion 9o and a final vertical portion 9p. The right side of pot 9 is made up of a stepped portion 9q, a downwardly and inwardly sloping portion 9r, a vertical portion 9s, another downwardly and inwardly sloping portion 9t and a final vertical portion 9u. The lower vertical wall portions 9e, 9k, 9p and 9u terminate in a bottom 9v. The bottom 9v slopes rearwardly and downwardly, as is clearly shown in FIGS. 4 and 5. The lower rear vertical wall portion 9k is provided with a drain pipe 32 having a control valve 33 therein. This allows the cooking oil from vat 9 to be drained for replacement or filtering.

The majority of the pot vertical wall portions 9c, 9h, 9n and 9s, together with the downwardly and inwardly sloping portions 9d, 9j, 9o and 9t have affixed thereto a surrounding shell-like structure which defines the combustion chambers and flue passageways, and also serves as the mounting structure for the burner units. The shell is made up of sheet metal parts joined together by machine screws and affixed to the pot 9 by means of threaded studs welded to the exterior of the pot.

The left and right sides of the shell are generally indicated at 34 and 35 and are essentially mirror images of each other so that a description of shell side 34 may be considered a description of shell side 35, as well. Shell side 34 begins with an upturned flange 34a affixed to the pot side by a series of studs 36 (see FIG. 7). From the upturned flange 34a, the shell side 34 has an outwardly extending portion 34b and a downwardly depending portion 34c. Panel portion 34c terminates in a downwardly and inwardly extending panel portion 34d which more or less parallels the adjacent side portion 9t of the vat. The panel portion 34d terminates in a downwardly depending flange 34e, affixed to the side of the vat by threaded studs welded to the exterior of the vat. One such threaded stud is shown at 37.

As is most clearly shown in FIG. 6, the shell side 34 extends somewhat beyond the front and rear walls of pot 9. That part of side panel 34 which extends forwardly of the pot front wall, adjacent flange 34e, is provided with a Z-shaped portion 34f (see FIG. 7). The forward edge of panel portion 34d is provided with a rectangular depression, 34g adapted to receive an igniter 38, to be described hereinafter. Similar parts of the shell side 35 have been indicated at 35a through 35g. A second igniter 39 is mounted in the rectangular depression 35g.

A longitudinally extending, Z-shaped baffle 40 abuts the adjacent pot side and is attached to the panel portion 34c by machine screws, not shown. The baffle 40 divides the space between shell side 34 and the adjacent pot side into a longitudinally extending combustion chamber 42 and a longitudinally extending flue passage 43. A generally U-shaped sheet metal member 44 is affixed to the shell side portion 34b and to the baffle 40 by machine screws (not shown) and defines a space filled by insulation 45. Similarly, the left side of the shell is provided with a longitudinal baffle 46, equivalent to baffle 40 and a generally U-shaped longitudinally extending sheet metal member 47, equivalent to sheet metal member 44. The sheet metal member 47 encloses insulative material 48. The baffle 46 divides the space between shell side 35 and the adjacent pot side into a longitudinally extending combustion chamber 49 and a longitudinally extending flue passage 50.

Figure 8:
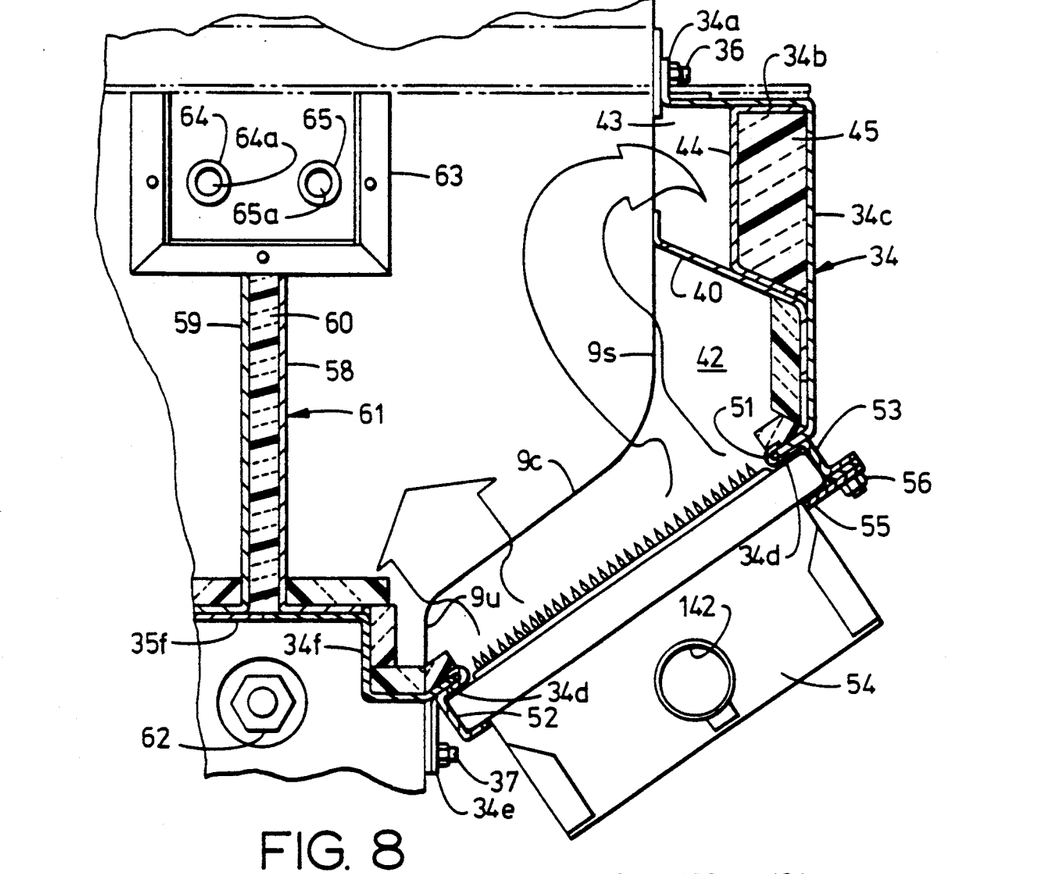
FIG. 8 is a fragmentary enlargement of a portion of FIG. 7.
Figure 9:
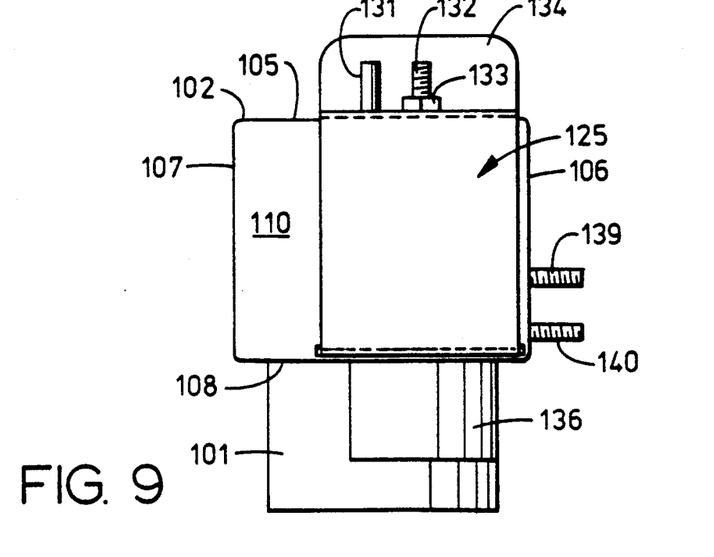
FIG. 9 is a left end elevational view of the air box.

Turning to FIG. 8, it will be noted that the downwardly and inwardly sloping panel portion 34d of shell side 34 has a rectangular opening 51 therein which constitutes the majority of the area of panel portion 34d. As a result, panel portion 34d takes on the configuration of a frame member with narrow sides and ends. Hook-like frame members 52 and 53 are engaged on the edges of panel portion 34d which define the opening 51. The frame members 52 and 53 support and retain a gas burner unit 54. The upper edge of burner unit 54 is engaged in the hook-like frame member 52 and is retained in the hook-like frame member 53 by a metallic strip 55 affixed thereto by bolts 56. The front and rear edges of burner 54 are engaged by frame elements (not shown) similar to elements 53 and 55. Thus, the burner unit 54 is removably mounted on the shell panel portion 34d. As is apparent from FIG. 7, an identical gas burner unit 57 is removably mounted on the left shell side panel element 35d. The gas burner units 54 and 57, including their purpose and operation, will be described further hereinafter.

Again, addressing attention to FIG. 7, it will be noted that the Z-shaped shell panel portions 34f and 35f support a pair of angle members 58 and 59 with an insulation layer 60 therebetween. The structure 58, 59 and 60 forms a vertical baffle (generally indicated at 61) which extends between the front wall of pot 9 and the front end plate of the surrounding shell, to be described hereinafter.

It will be noted that the shell side panel portions 34f and 35f form a box-like configuration about a port 62 formed in the pot wall 9e. The purpose of port 62 will be set forth hereinafter. The vertical baffle 61 is surmounted by a three-sided element 63 which extends between the pot front wall portion 9d and the adjacent end plate (not shown) of the surrounding shell. The element 63 forms a box-like structure about a pair of sensor mounts 64 and 65 which extend through the pot wall 9d. Sensor mounts 64 and 65 will be further described hereinafter. It will be noted that the inside surfaces of shell portions 34c, 35c, 34d, 35d, 34f and 35f are covered with block insulation. Any appropriate insulative material may be used for this purpose. Excellent results are achieved with an insulative material manufactured by Carborundum Company, of Niagara Falls, New York, under the trademark Fiberfrax.

Reference is made to FIG. 4 wherein the forward end of the shell is completed by a front end cover, generally indicated at 66. Front end cover 66 is attached to front end flanges formed on the shell sides 34 and 35 by machine screws, some of which are shown at 67. The upper end of front end cover 66 is provided with a rearwardly extending panel-like portion 68 terminating in an upstanding flange 69 affixed to the pot front wall Portion 9c by a series of studs 70 welded to the pot front wall portion 9c. Front end panel 66, at its lowermost Portion, has an inwardly extending part 71 (see FIGS. 4 and 6) which underlies the Z-shaped side panel portions 34f and 35f. This last-mentioned part of front end panel 66 terminates in a vertical wall portion 72 which is appropriately fastened to the front wall portion 9e of pot 9 by threaded studs or the like affixed to the exterior surface of the pot. The wall 72 has a circular opening 73 formed therein (see FIG. 4) to accommodate the fitting 62.

It will be noted that front end panel 66 has a rectangular opening 74 formed therein exposing fittings 64 and 65. The front panel additionally has a pair of openings 75 and 76 located near ignition ignitors 38 and 39, respectively. The openings or ports 75 and 76 are covered with tempered glass (not shown) and constitute observation ports for the flames of burner units 54 and 57, respectively. The surfaces of front end panel 66 facing the pot 9 may be provided with a layer of block insulation, as shown.

Reference is now made to FIGS. 5 and 6. That part of shell side panel portions 34d and 35d which extend rearwardly of pot 9 terminate in portions 34g and 35g which extend horizontally toward each other and abut each other. Panel portions 34g and 35g support a vertical baffle generally indicated at 77 and similar in construction to vertical baffle 61. In addition, there is a transverse baffle 78, immediately above baffle 77. The baffle 78 is provided with an upstandinq flange 79 which is affixed to the adjacent pot rear wall portion 9h by threaded studs welded to the pot wall portion 9h. The transverse horizontal baffle 78 has end portions which underlie baffles 40 and 46. As a result, the horizontal, transverse baffle 78 serves as a continuation around the rear wall of the pot of baffles 40 and 46.

The shell surrounding pot 9 is completed by a rear end panel, generally indicated at 80. Rear end panel 80 is a substantially planar member, the upper end of which has a forwardly extending portion 81, terminating in an upstanding flange 82. The flange 82 is affixed to the rear wall portion 9h of pot 9 by means of threaded studs welded to the pot rear wall portion 9h. The peripheral side edges of rear end panel 80 are affixed to flanges on the rear side edges of shell side panels 34 and 35 by machine screws (not shown). The bottom-most edge of rear end panel 80 is provided with an inwardly extending portion 83 which underlies the side panel portions 34g and 35g. The rear end panel portion 83 terminates in a downwardly depending flange 84 affixed to the pot rear wall portion 9k by means of threaded studs welded thereto. Centrally of rear end panel 80 and near its upper edge, the panel is provided with a rectangular opening 85 to which the pressure cooker flue (generally indicated at 86) is attached. The flue 86 has a lowermost vertical portion 86a leading to a skewed horizontal portion 86b, which terminates in a vertical portion 86c. The uppermost flue portion 86c extends upwardly within and through the top of housing 13, as shown in FIG. 1.

Wherever the above described shell has a flange to be directly attached to the pot 9, a strip of insulation may be located between the shell flange and the pot.

The burner units 54 and 57 are identical and may constitute any appropriate gas fired units. Excellent results have been achieved with ceramic faced, infrared radiant burner units of the type manufactured by Solartronics, Inc., of Rochester, Michigan, under the designation 699602. Such burners achieve a surface temperature of about 1600° F. and heat the pot 9 by both convection and radiation. The burner units 54 and 57 require a source of air, next to be described.

To this end, a blower 87 is appropriately mounted within cabinet 2. For purposes of an exemplary showing, the blower 87 is illustrated as being mounted on bracket elements 88 and 89. Bracket element 89 is affixed to the lower horizontal box beam 24. The blower 87 has a motor 90.

The blower has an intake opening 91 with a corresponding, concentric opening 92 formed in bracket 88. The blower 87 has a discharge opening 93 to be further described hereinafter.

Referring to FIGS. 4 and 7, a damper plate 94 is pivotally connected to the support bracket 87 as at 95. The damper plate 94 has a forwardly extending flange 97 along one of its edges, serving as a handle. Finally, the damper plate 94 has an arcuate slot 98 formed therein through which a bolt 99 extends. The bolt 99 is threadedly engaged in the support bracket 88.

The damper plate 94 can be pivotally shifted between a full open position shown in full lines in FIGS. 4 and 7, and a position in which it partially closes the fan intake opening 91, as shown in broken lines in FIG. 4. Damper plate 94 can be held in any shifted position by bolt 99 and thus can be used to control the overall amount of air delivered by the fan 87 at its discharge opening 93.

The discharge opening 93 of fan 87 is connected by a flexible hose or conduit 100 to the intake 101 of an air manifold box 102. The hose 100 may be provided with an insulative sleeve 103.

As is most clearly shown in FIGS. 3 and 6, the air manifold box 102 is supported in front of the pot 9 and its surrounding shell by a bracket 104 attached to box beam 29. The air manifold box 102 is most clearly shown in FIGS. 9-12.

The air manifold box 102 comprises an elongated, rectangular box having a top 105, a front side 106, a rear side 107, a bottom 108, a right end 109 and a left end 110. The air manifold box inlet 101 is affixed to the air manifold box bottom 108. At the juncture of the air manifold box right hand end 109 and bottom 108 there is a slot 111 (see FIGS. 11 and 12). A U-shaped slide, generally indicated at 112, is provided.

Slide 112 has a vertical base 113 terminating in an upper horizontal leg 114 and a lower horizontal leg 115. The upper horizontal leg, itself, terminates in an upturned flange 116, serving as a handle.

Figure 10:
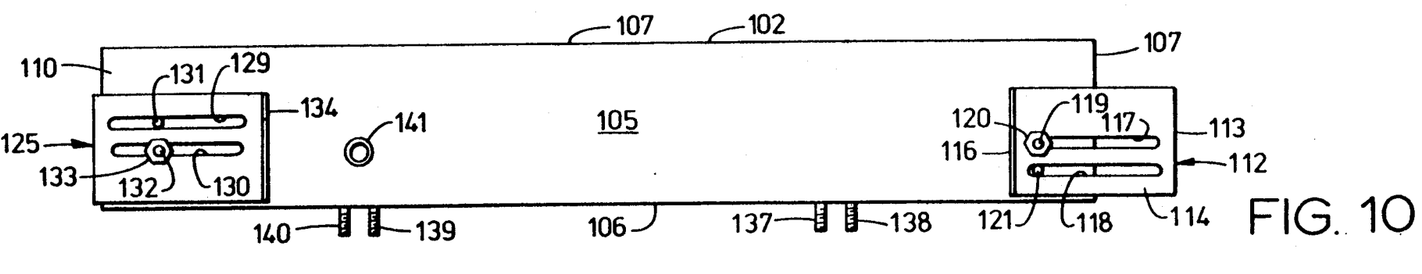
FIG. 10 is a plan view of the air box.

As is most clearly shown in FIG. 10, the upper leg 114 has a pair of longitudinally extending slots 117 and 118. Slot 117 receives a threaded stud 119 welded to the top 105 of air box 102. The stud 119 is provided with a nut 120. The slot 118 receives a guide pin 121.

Figure 11:
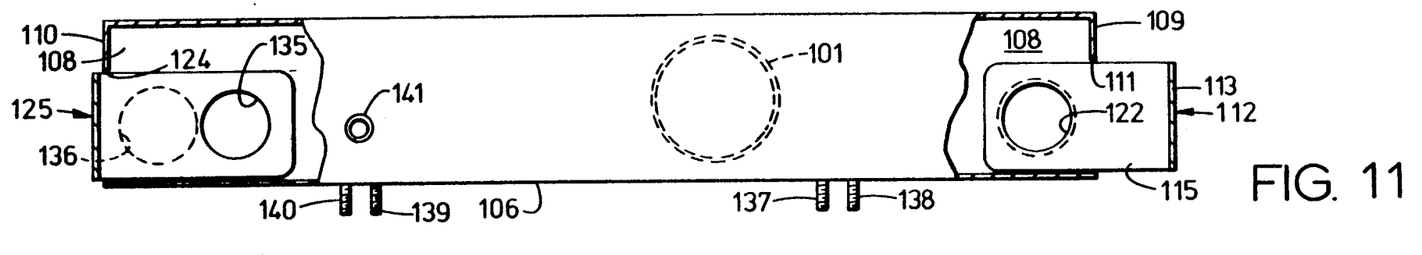
FIG. 11 is a plan view of the air box partly in cross-section.
Figure 12:
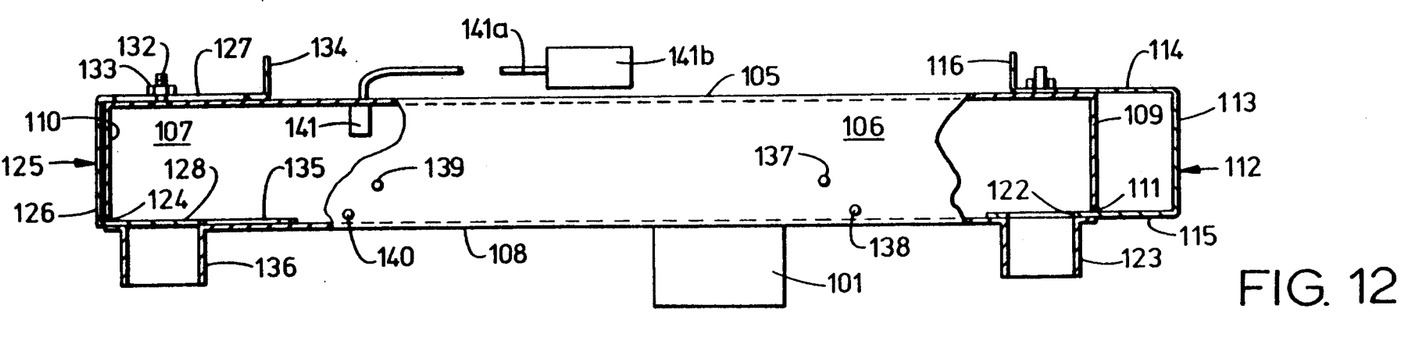
FIG. 12 is a front elevational view, partly in cross-section of the air box.

As is shown in both FIGS. 11 and 12, the lower slide leg 115 extends through slot 111 of air manifold box 102 and is provided with an opening 122 having a diameter substantially equal to the internal diameter of an outlet fitting 123 formed on the bottom 108 of air manifold box 102.

It will be apparent from the above, that the slide 112 is adjustable, being shiftable longitudinally of air manifold box 102. In FIGS. 11 and 12, the slide perforation 122 is shown coaxial with the air manifold box outlet 123, such that the air manifold box outlet 123 is open and completely unobstructed. It will be appreciated that if the slide 112 is shifted to the left, as viewed in FIGS. 10-12, it will close outlet 123 to varying degrees, until outlet 123 is completely closed, when the slide 112 reaches the limit of its lefthand movement.

The end 110 of air manifold box 102 has a slot 124 formed at the juncture of end 110 and bottom 108. The slot accommodates the lower leg of a slide generally indicated at 125 and identical to slide 112. The slide 125 has a base portion 126, an upper leg 127 and a lower leg 128. The upper leg is provided with slots 129 and 130 receiving a guide pin 131 and a threaded stud 132, respectively. The threaded stud 132 is provided with a nut 133. The upper leg terminates in an upstanding flange 134, serving as a handle. The lower leg is provided with an opening 135 corresponding to the internal diameter of an air manifold outlet fitting 136 formed at the left end of the air manifold box bottom 108 (as viewed in FIGS. 10-12). For purposes of an exemplary showing, the slide 125 is illustrated in the Figures in its full outlet-closing position.

The slides 112 and 125 determine the amount of air exiting air manifold box 102 via its outlets 123 and 136. The purpose for this will be apparent hereinafter. When the slides have been located in their desired position, they may be maintained there by tightening the nuts 120 and 133.

The front face 106 of air manifold box 102 is provided with two pairs of studs 137-138 and 139-140. The studs 137-140 are threaded and constitute the means by which the air manifold box 102 is affixed to its mounting bracket 104. Finally, the air manifold box 102 is provided at its top with a fitting 141 adapted to receive a tube 141a leading to an air pressure switch 141b. The purpose of the fitting 141 and the air Pressure switch 141b will be apparent hereinafter.

In FIG. 7, the inlets 142 and 143 of burner units 154 and 157, respectively, are shown. As is most clearly illustrated in FIG. 4, the outlet 123 of air manifold box 102 is connected to the inlet 142 of burner unit 54 by a conduit 145. In similar fashion, the outlet 136 of air manifold box 102 is connected to the inlet 143 of burner unit 57 by a conduit 145. Thus, by the means described, air is provided to the burner units 54 and 57.

It is, of course, necessary to provide gas for burner units 54 and 57. To this end, gas inlet lines 146 and 147 are connected to the inlets 142 and 143 of burner units 54 and 57, respectively. The gas inlet lines 146 and 147 are shown in FIGS. 3, 4 and 6. Gas inlet lines 146 and 147 are converted to a single gas line (not shown) by means of a T-fitting (not shown). The single gas line is connected to the outlet of a gas valve 148 (see FIG. 3). The gas valve 148 is connected by a line (not shown) to a source of natural gas or propane (not shown). The gas valve 148 is located directly behind the small panel 149 shown in FIG. 1. Gas valve 148 has both an electrical actuator (not shown) and a manual actuator (shown at 150 in FIG. 1).

The amount of gas fed to burner units 54 and 57 is metered by orifice fittings (not shown) at the juncture of gas conduits 146 and 147 and burner inlets 142 and 143, respectively. As has been described above, the overall amount of air fed to burner units 54 and 57 can be controlled by damper plate 97 at blower 37. In addition, air to the burner units can be individually regulated by slides 112 and 125 on air manifold box 102. When the air/gas mixture is correct, the burner unit flames should be orange-red. Too much or too little air will cause the flames to maintain a dull blue color. The lower panel 18 of the large capacity pressure cooker is provided with observation ports 151 and 152 (see FIG. 1), which are substantially coaxial with the observation ports 75 and 76 in the front end panel (FIG. 4). This enables the operator to visually monitor the burner units from the exterior of the pressure cooker.

It will be remembered that the combustion chambers 42 and 49 are defined by shell side walls 34 and 35 and longitudinally extending baffles 40 and 46. As is apparent from FIG. 7, the combustion chambers 42 and 49 extend around the rear of pot 9 and are defined by the adjacent pot wall, rear end panel 80 and baffle 78. The combustion chambers 42 and 49 are separated from each other at the rear of the pot by vertical baffle 77. At the front end of the pot, the combustion chambers 42 and 49 are separated from each other by a vertical baffle 61. However, there is no horizontal baffle separating the combustion chambers 42 and 49 from flue passages 43 and 50. Again, from FIG. 5, it will be noted that flue passages 43 and 50 merge at opening 85 leading to flue 86. By virtue of this arrangement and the fact that the air and gas is fed to burner units 54 and 57 under slight pressure, the products of combustion in combustion chambers 42 and 49 will circulate towards the front of pot 9 and will enter flue passages 43 and 50. The products of combustion will travel rearwardly of the pot 9 and in heat exchange therewith to the flue 86. From flue 86, the products of combustion are appropriately discharged.

Mounted within cabinet 2, along cabinet side 4 there is a control box 153 (see FIG. 1). The control box contains a power transformer which steps down incoming voltage to control voltage. The control box also contains air pressure switch 141b (see FIG. 12) and control modules (not shown) for burner units 54 and 57. The igniters 38 and 39 are fast-acting, hot surface igniters, each provided with a glow bar. The glow bar 154 of ignitor 38 is shown in FIG. 6. The glow bar is located just above the ceramic surface of burner unit 54. Usual hot surface ignitors take 30 to 45 seconds to reach ignition temperature of 2400° F. For the purposes of the present invention, this is too long a period of time, because it will allow the oil within pot 9 to cool when the product being cooked is immersed therein. The fast-acting ignitors 38 and 39 require about 4 seconds to reach ignition temperature. Exemplary fast-acting ignitors are available from Norton Company of Worcester, Maine, under the designation 401. The modules for burners 54 and 57 will turn on the ignitor glow bars. Four seconds later (time for the glow bars to reach ignition temperature) the modules for the burners 54 and 57 will send a low current signal to the electric control of gas valve 148, opening the valve to allow gas to flow to burners 54 and 57.

The glow bars of ignitors 38 and 39 are located within the burner flames and act as sensors therefor. So long as flames exist, the glow bars will send a low current signal to the burner control modules. This low current signal will stop, in the absence of a flame, causing the burner unit control modules to shut down gas valve 148.

The air pressure switch 141b, connected to air manifold box 102, and located within control box 153, is wired in series with the burner unit control modules and the gas valve 148. Should blower 87 fail for any reason, air pressure will drop in air manifold box 102 and the air pressure switch 141b will break the circuit between the burner unit control modules and the gas valve, shutting off the flow of gas. The elements within control box 153 are accessible for adjustment, replacement and repair through a panel 154 in the side 4 of cabinet 2 as is shown in FIG. 2.

Reference is made to FIG. 1. In FIG. 1, the upper panel 17 comprises the control panel. The control panel has a main on-off switch 155. The main switch 155 is a double throw, center-off switch. When thrown in one direction, switch 155 will provide power to the transformer within control box 153 and will initiate a "melt cycle" pulsing the burner units 54 and 57 to bring the oil within pot 9 to about 185° F. Thereafter, a selected cycle will be performed by the pressure cooker. When the main switch 155 is thrown in the opposite direction, power is directed only to a receptacle 156 located on lower panel 18. An oil recirculation unit (not shown), known in the art, is rolled within cabinet 2 beneath pot 9 The oil recirculation unit has a pump which is connected to and energized by receptacle 156. A recirculation hose from the recirculation unit is attached to fitting 157 on lower panel 18. The fitting 157 is connected by a conduit (not shown) to the port 62 in the lower portion of pot 9 (see FIGS. 4, 7 and 8). The valve 33 in the pot drain conduit 32 is connected by linkage 158 (see FIGS. 1, 4, 5, and 7) to an actuating knob 159 mounted on lower panel 18 (see FIG. 1). The operator opens valve 33 causing the oil in pot 9 to discharge into the recirculating unit for filtering and recirculation.

For purposes of an exemplary showing, the pressure cooker of the present invention is capable of being pre-programmed with eight different cycles. To this end, panel 17 is provided with a bank of 8 cycle indicator and select switch elements, generally indicated at 160. To enable programming of the pressure cooker, panel 17 contains a series of programming switches generally indicated at 161 and a series of time/temperature displays, generally indicated at 162.

Turning to FIG. 3, it will be noted that the cabinet is provided with a block of insulation located between the shell and the panel 66 and the air manifold box 102. This insulative panel, indicated at 163, serves as a heat shield for control panel 17.

Referring next to FIG. 4, the fitting 64 mounts a high limit sensor 64a. The high limit sensor monitors the temperature of the oil within pot 9. If the oil temperature exceeds a predetermined setpoint, the sensor will cause gas valve 148 to be closed.

The fitting 65 contains a sensor 65a for monitoring the temperature of the oil within pot 9. This sensor will cause the burner units 54 and 57 to turn on or off to maintain the predetermined oil temperature called for in the particular cycle being used.

Modifications may be made in the invention without departing from the spirit of it. For example, the insulative material located on the inside surfaces of the shell surrounding pot 9 could be cast into a number of pre-formed parts, thereby facilitating assembly of the shell.

What is claimed is:

1. A large capacity pressure cooker comprising a cabinet containing a large pot charged with a predetermined amount of cooking oil, said pot having side, front and rear walls, an open top and a bottom, said pot top extending partway above said cabinet, a removable pressure-tight lid for said open top, an insulated shell mounted on and fully surrounding said pot, substantially intermediate said open top and said bottom, said shell being spaced from said pot front, side and rear walls and having upper and lower peripheral edges sealed thereto, a radiant burner utilizing a gas/air mixture being supported in parallel spaced relationship to each pot side, each burner extending beyond the junctures of said front and rear pot walls and its respective pot side wall, horizontal baffles within said shell dividing said space between said shell and said pot walls into a combustion chamber and a flue passageway for each burner, each flue passageway being located above its respective combustion chamber, said combustion chambers being separated from each other by vertical baffles at the center of said pot front and rear walls, said flue passageways being separated from each other centrally of said pot front wall and being connected to a flue centrally of said pot rear wall, each combustion chamber being connected to its respective flue passageway at said pot front wall, whereby products of combustion from the burner in each combustion chamber circulate along the rear and adjacent side walls of the pot to the front wall thereof and thereafter enter the adjacent flue passage and circulate along the front, adjacent side wall and rear wall, in heat exchange therewith, to said flue.

2. The large capacity pressure cooker claimed in claim 1 wherein each of said burners has an inlet for said gas/air mixture, a source of gas for said burners, conduit means for said gas from said source thereof to said burner inlets, a gas valve in said conduit means having a manual actuator and an electric actuator in turn on and off the flow of gas from said source to said burner inlets, and means to meter the amount of gas entering each burner inlet.

3. The large capacity pressure cooker claimed in claim 2 including a blower operatively connected to said inlets of said burners to supply air thereto for said gas/air mixture, means to regulate the overall air output of said blower and means to individually regulate the amount of air entering each burner inlet.

4. The large capacity pressure cooker claimed in claim 3 including control modules for said burners, a fast-acting ignitor for each burner, each ignitor having a glow bar, said modules being actuatable to activate said ignitor glow bars and to open said electric actuator of said gas valve to ignite said burners, said glow bars being located in the flames of their respective burners and comprising sensors sending a low current signal to said modules so long as flames are present at said burners, means in said modules to close said electric actuator of said gas valve in the absence of said signals from said glow bars indicating the absence of flames.

5. The large capacity pressure cooker claimed in claim 4 including an air pressure switch connected to said means regulating the amount of air enter in each burner, means in said modules responsive to said air pressure switch to close said electric actuator of said gas valve upon failure to said blower.

6. The large capacity pressure cooker claimed in claim 1 including programmable means to cause said cooker to perform one of a plurality of cycles, means to program said cycles and means to select the cycle to be performed.

7. The large capacity pressure cooker claimed in claim 1 wherein each of said burners has an inlet for said gas/air mixture, a source of gas for said burners, a gas conduit from said source to a gas valve having an electrical actuator and a manual actuator, a gas conduit from said valve terminating in a branch gas conduit to each burner inlet, said branch gas conduits each terminating in a gas metering orifice fitting at its respective burner inlet.

8. The large capacity pressure cooker claimed in claim 1 wherein each of said burners has an inlet for said gas/air mixture, a blower having an inlet and an outlet, a damper plate adjacent said blower inlet to regulate the amount of air exiting said blower outlet, an air manifold box having an inlet, said air manifold box inlet being connected to said blower outlet, said air manifold box having two outlets each connected to said air inlet of one of said burners, slide means in association with each air manifold box outlet and shiftable to open and close said outlets to individually regulate the amount of air entering each burner.

9. The large capacity pressure cooker claimed in claim 8 including control modules for said burners, a fast-acting ignitor for each burner, each ignitor having a glow bar, said modules being actuable to activate said ignitor glow bars and to open said electric actuator of said gas valve to ignite said burners, said glow bars being located in the flames of their respective burners and comprising sensors sending a low current signal to said modules so long as flames are present at said burners, means in said modules to close said electric actuator of said gas valve in the absence of said signals from said glow bars indicating the absence of flames.

10. The large capacity pressure cooker claimed in claim 9 including an air pressure switch connected to said air manifold box, means in said modules responsive to said air pressure switch to close said electric actuator of said gas valve upon failure of said blower.

11. The large capacity pressure cooker claimed in claim 10 including ports in said shell and said cabinet enabling visual checking of said burners.

12. The large capacity pressure cooker claimed in claim 11 including programmable means to cause said cooker to perform one of a plurality of cycles, means to program said cycles and means to select the cycle to be performed.

* * * * *